(12) United States Patent
Segato

(10) Patent No.: US 7,651,162 B2
(45) Date of Patent: Jan. 26, 2010

(54) CUSTOMIZABLE SADDLE STRUCTURE, PARTICULARLY FOR BICYCLES, HAVING A REMOVABLE SEAT ELEMENT

(75) Inventor: Stefano Segato, Vicenza (IT)

(73) Assignee: Selle Royal SpA, Pozzoleone (IT)

( * ) Notice: Subject to any disclaimer, the term of this patent is extended or adjusted under 35 U.S.C. 154(b) by 0 days.

(21) Appl. No.: 12/066,492

(22) PCT Filed: Sep. 12, 2006

(86) PCT No.: PCT/IB2006/053240

§ 371 (c)(1),
(2), (4) Date: Mar. 12, 2008

(87) PCT Pub. No.: WO2007/031943

PCT Pub. Date: Mar. 22, 2007

(65) Prior Publication Data

US 2008/0211272 A1    Sep. 4, 2008

(30) Foreign Application Priority Data

Sep. 13, 2005    (IT) ............................ VI2005A0240

(51) Int. Cl.
*B62J 1/00* (2006.01)
*A47C 7/00* (2006.01)

(52) U.S. Cl. .............................. 297/195.1; 297/440.14; 297/440.22

(58) Field of Classification Search ............ 297/195.13, 297/195.12, 440.14, 440.22, 195.1, 214, 297/196

See application file for complete search history.

(56) References Cited

U.S. PATENT DOCUMENTS

| 576,192 | A | | 2/1897 | Hoyt |
| 3,997,214 | A | | 12/1976 | Jacobs |
| 4,889,385 | A | | 12/1989 | Chadwick |
| 6,022,073 | A | * | 2/2000 | Yates ........................ 297/214 |
| 6,039,396 | A | | 3/2000 | Muser |
| 6,135,562 | A | * | 10/2000 | Infanti ..................... 297/440.2 |
| 7,059,673 | B1 | | 6/2006 | Lee |
| 7,377,589 | B1 | * | 5/2008 | Glater ................... 297/440.14 |
| 2008/0211271 | A1 | | 9/2008 | Segato |

FOREIGN PATENT DOCUMENTS

EP        0005990       12/1979
JP        06008862      1/1994

* cited by examiner

*Primary Examiner*—Milton Nelson, Jr.
(74) *Attorney, Agent, or Firm*—Themis Law

(57) ABSTRACT

A customizable seating structure, designed to be connected to a movable or stationary frame. The structure comprises a seat element (2) which has a top surface, designed to at least partly contact a user, and a support element (4) underlying the seat element (2) and designed to be connected to the movable or stationary frame (T). The seat element (2) is removably attached to said support element (4) to allow removal and/or replacement thereof by a user. The seat element (2) is attached to the support element (4) by screws (7) and nuts (9) or press-fit of pins (13) in holes (8). The seat element (2) is composed of a resilient upper body (15) removably connected to a semirigid lower body (16).

7 Claims, 3 Drawing Sheets

CUSTOMIZABLE SADDLE STRUCTURE, PARTICULARLY FOR BICYCLES, HAVING A REMOVABLE SEAT ELEMENT

FIELD OF THE INVENTION

The present invention finds application in the field of support structures, and particularly relates to a customizable seating structure for human body support.

BACKGROUND OF THE INVENTION

In the field of seating structures for human body, particularly bicycle saddles, car seats or chairs in general, comfort of such structures is increasingly desired.

For this purpose, it is important for the user to customize the type of seat and especially to adapt its configuration to his/her physical needs, and particularly to his/her body conformation.

It is equally important to adapt the seat element to user positions and to the different conditions of use. For instance, in the specific case of a bicycle, the position of a user is related to the speed he/she desires to maintain during cycling. Therefore, particular advantages may be derived from adapting the seat type to particular needs, e.g. by varying the saddle width, in a simple manner and without making substantial changes to the whole structure.

As is known in the art, the element that forms the seat proper, and is designed to contact the human body, is generally connected to a lower support structure by connection systems, which are typically non removable. In common bicycles, for example, the seat element is joined by gluing or stitching to the shell that forms the support structure connected to the bicycle frame.

A drawback of this solution is that changes cannot be or are not easily made to the seat configuration to customize it and adapt it to the user's needs. For example, a common bicycle saddle, as well as its seat post, must be wholly replaced. Therefore, a number of saddle—seat post assemblies have to be available, which involves problems associated to the cost of these assemblies, and to the bulk thereof.

In an attempt to overcome such drawback, a number of different solutions have been provided, in which the seat element is able to be disengaged, at least partially, from the structure that connects it to the frame.

U.S. Pat. No. 6,039,396 and U.S. Pat. No. 4,462,634 disclose bicycle saddles, in which the upper saddle element is only partly disengageable from the saddle frame to control shock absorbing properties, e.g. by inserting or removing internal shock-absorbing elements.

While these solutions allow partial adaptation of the seat, they still have the drawback of limiting customization, and particularly of preventing saddle width variations. Furthermore, the insertion of elements beneath the saddle may affect comfort thereof, in case of imperfect coupling with the upper element.

U.S. Pat. No. 5,890,760 discloses a bicycle saddle having a second outer cover element to change the seat type.

This solution provides a very little seat customization potential and further requires the use of an element that is substantially foreign to the original structure, and cannot ensure perfect integration therewith and comfort.

SUMMARY OF THE INVENTION

The object of this invention is to overcome the above drawbacks, by providing a customizable seat for human body support that is practical, cost-effective and most of all efficient.

A particular object is to provide a seating structure for human body support that is highly customizable and can fit the different user needs.

A further object is to provide a seating structure for human body support that allows to make changes to its configuration in a very simple, quick and reliable manner.

Yet another important object of this invention is to provide a seating structure that allows customization without affecting comfort.

These and other objects, as better explained hereafter, are fulfilled by a customizable seating structure for human body support, which comprises a seat element having a top surface, designed to at least partly contact a user, and a support element underlying the seat element and designed to be connected to a movable or stationary frame. The structure is characterized in that the seat element is removably attached to the support element to allow removal and/or replacement thereof by a user.

This feature of the invention provides a seating structure that is highly customizable in terms of both size and shock absorbing properties. Thus, by only changing the seat element the user can fit a variety of physical, usage or aesthetic needs, without replacing the whole structure, thereby achieving apparent advantages in terms of cost and bulk reduction.

Advantageously, the structure may include removable anchor means on the support element and the seat element respectively.

Conveniently, the removable anchor means may be a nut and screw assembly, including one or more screws which are received in through holes formed in the support element and may be engaged in corresponding aligned slots in the underside of the seat element.

Also, the removable anchor means may consist of a pin engageable in a correspondingly shaped recess and may include at least one pin formed in the underside of the seat element for engagement in respective through or blind holes in the support element.

These particular configurations allow simple and quick removal and replacement of the seat element, without using special tools or making very little use thereof. Also, no foreign element shall be added to the seat proper, for unaltered comfort of the whole structure.

Preferably, the seat element may be composed of an upper body and a lower body, in mutual coupling relation.

Advantageously, the upper body may have a resilient top face, suitably formed into a plurality of shapes, to fit various user needs and conditions of use.

Furthermore, the lower body may have coupling means for removable connection of the upper body to the lower body.

This configuration allows replacement of the upper body only, thereby providing further apparent advantages in terms of costs and size.

BRIEF DESCRIPTION OF THE DRAWINGS

Further features and advantages of the invention will be more apparent from the detailed description of a preferred, non-exclusive embodiment of a seating structure according to the invention, which is described as a non-limiting example with the help of the annexed drawings, in which.

DETAILED DESCRIPTION OF A PREFERRED EMBODIMENT

Referring to the above figures, a seating structure according to the invention, generally designated by numeral 1, may be configured for instance as a car seat, a chair or, as particularly shown herein, as a bicycle saddle.

Figure 1:
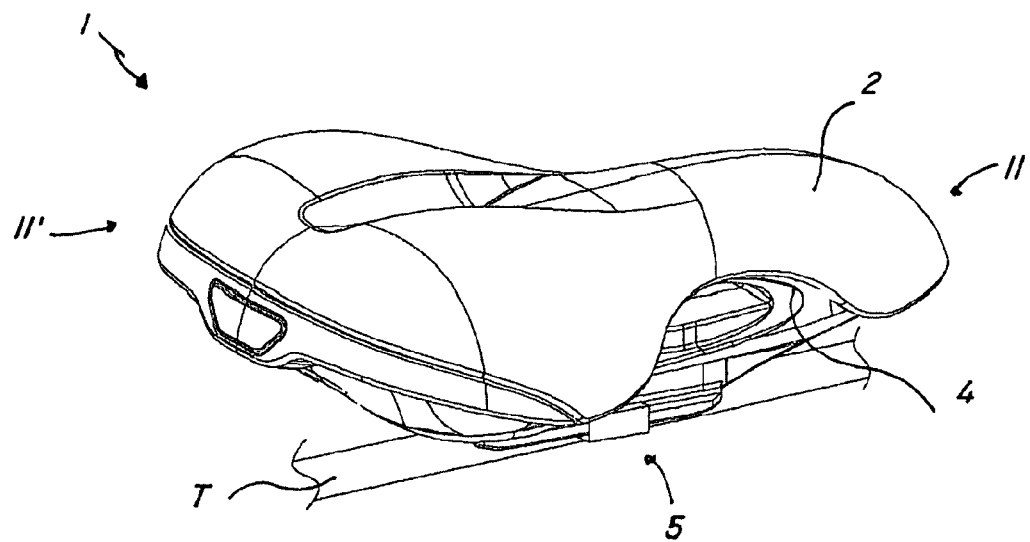
FIG. 1 is a perspective view of a seating structure according to the invention.

As shown in FIG. 1, the saddle comprises a seat element 2 which is designed to contact the user by its top surface 3, and is associated to an underlying support element 4. Thus, the structure may be connected to a bicycle frame T by suitable connection means 5.

According to the invention, the seat element 2 is removably attached to the first support element 4, so that the seat element 2 may be removed and possibly replaced by its user with corresponding similar or equivalent elements.

The seat element 2 may further enclose a resilient pad made of foam, sponge, elastomeric material, gel or the like, to increase seating comfort.

Conveniently, the support element 4 may be made of a rigid or semi-rigid material, namely reinforced polymer materials such as glass fiber-reinforced polyamide. Advantageously, the seat element 2 may be attached to the support element 4 by suitable removable anchor means 6.

Figure 2:
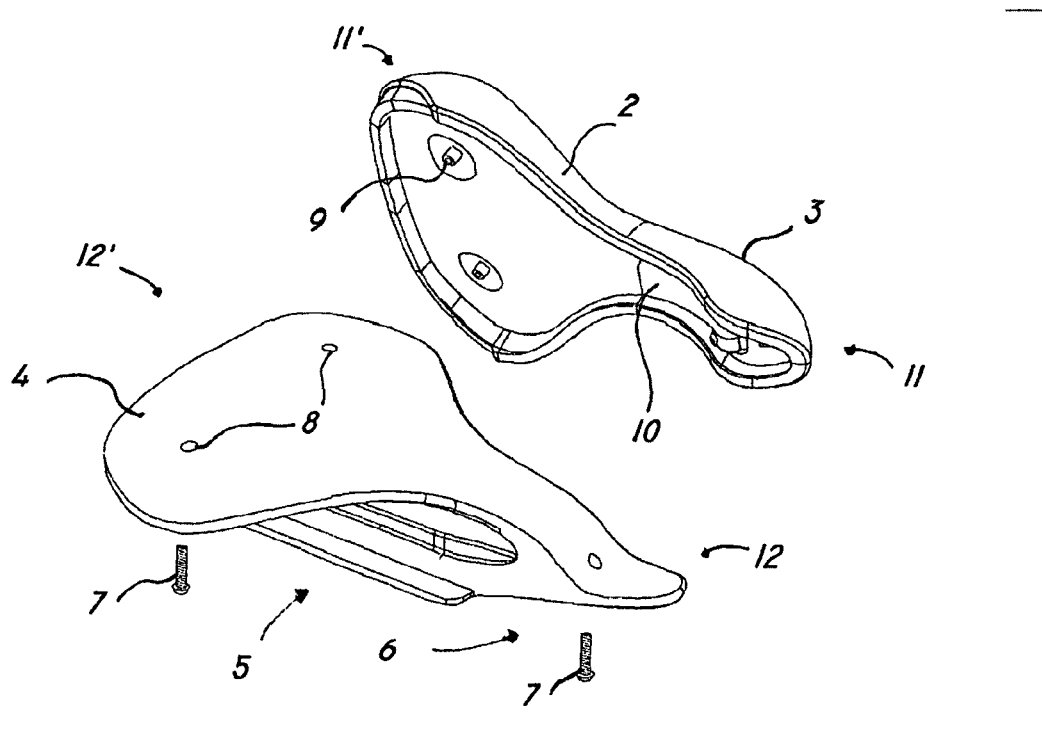
FIG. 2 is an exploded perspective view of a first embodiment of the structure according to the invention.
Figure 3:
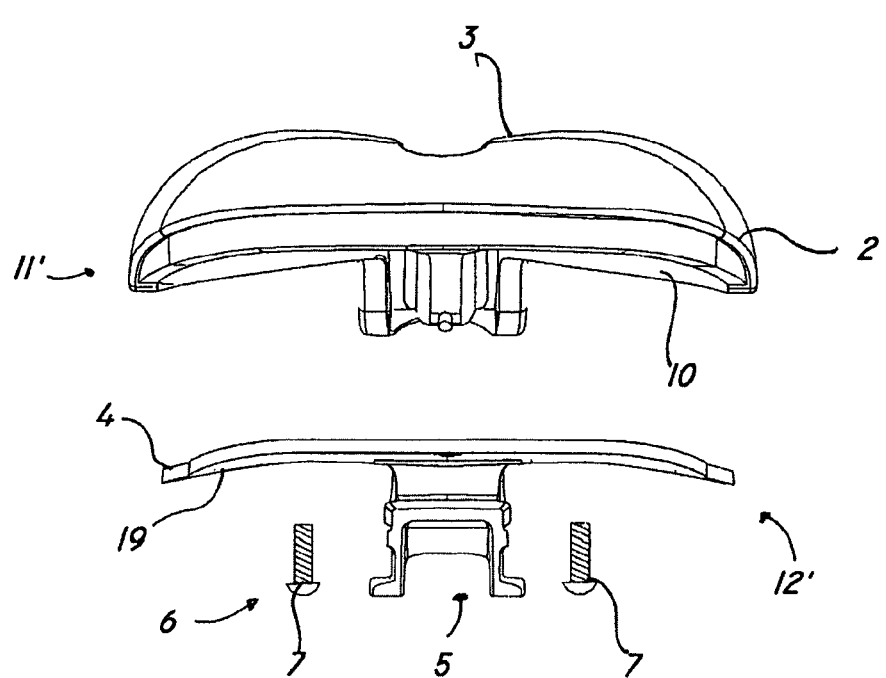
FIG. 3 is an exploded rear view of the structure of FIG. 2.

In a first embodiment, particularly shown in FIGS. 2 and 3, the means 6 may be a nut and screw assembly, and may include one or more screws 7 to be received in respective through holes 8 in the support element 4. The screws 7 will thus engage respective recess 9, aligned with the holes 8 and formed in the underside of the seat element 2.

For a more stable attachment between the seat element 2 and the support element 4, the holes 8 and the recess 9 are formed at the respective front portions 11, 12 and rear portions 11', 12' of each element 2, 4. Such portions may be configured to fit the seated user, whereby each element 2, 4 may have a widened rear portion 11', 12' and an elongate front portion 11, 12. Preferably, the elements 2, 4 will be substantially coincident in plan shape.

Figure 4:
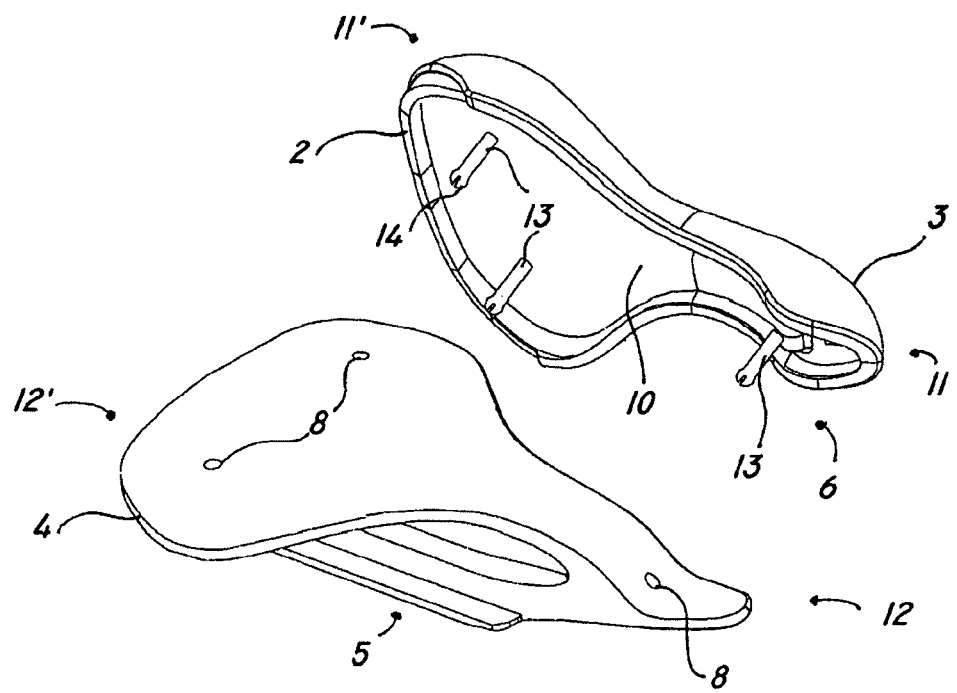
FIG. 4 is an exploded perspective view of a second embodiment of the structure according to the invention.
Figure 5:
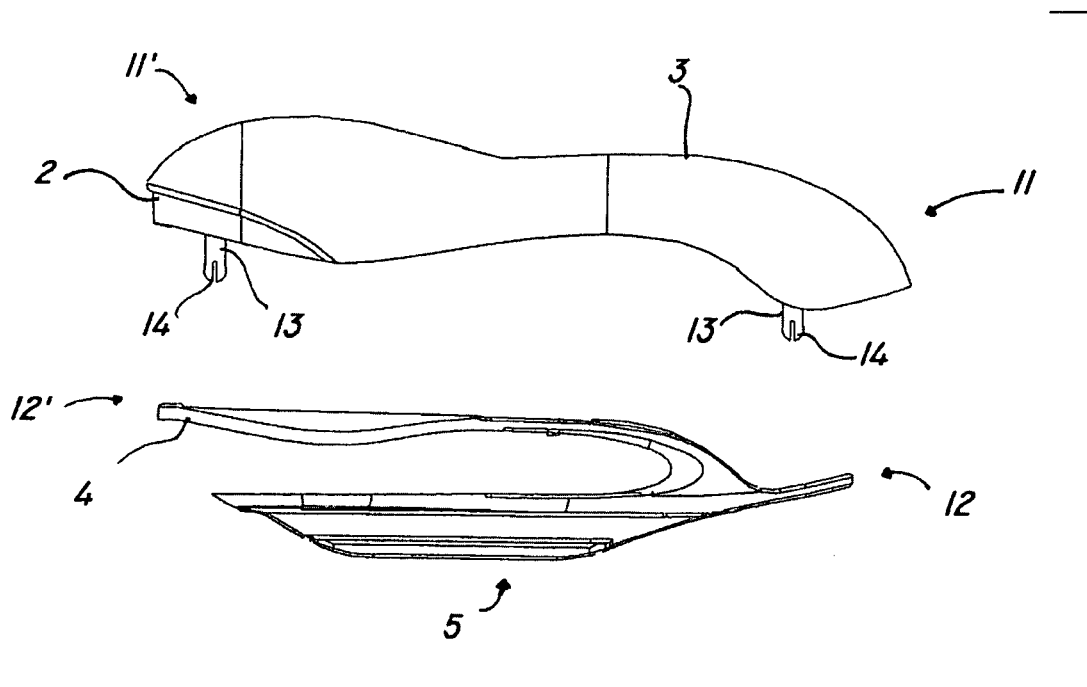
FIG. 5 is an exploded side view of the structure of FIG. 4.

In a second embodiment, as shown in FIGS. 4 and 5, the removable anchor means may also be one or more pins 13 formed in the underside 10 of the seat element 2. The pins 13 are designed to engage the holes 8 in the support element 4, hence they are formed in register therewith. The holes 8 may be blind or through holes, as a function of the expected length of the pins 13.

The pins 13 may be of the self-locking type, with a head 14 larger than the diameter d of each hole 8 and may be integral with the seat element 2.

Figure 6:
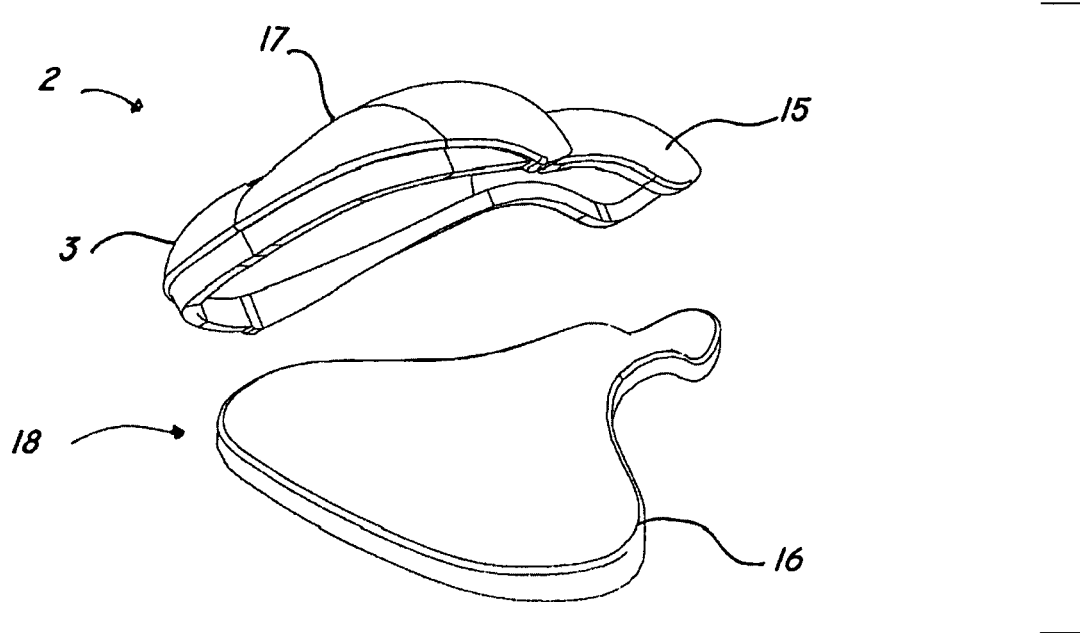
FIG. 6 is an exploded perspective view of a detail of FIG. 1.

In a particular embodiment, the seat element 2, as shown in FIG. 6, may be composed of an upper body 15, designed to act as an interface with the user, and including the pad, and of a lower body 16. The latter is coupled to the upper body 15 and particularly has the function of sustaining the loads associated to the seated user and of reinforcing the seat element 2. The lower body 16 may be made of a rigid or semirigid material, which may be identical to or different from the material of the support element 4.

Suitably, the upper body 15 may have a resilient top surface 17, which may be formed into a plurality of shapes to fit various seating, usage and aesthetic needs of users.

The two bodies 15, 16 may be connected to each other by suitable coupling means 18 on the lower body 16, and particularly the lower body 16 may be snap engaged with the upper body 15. Otherwise, the means 18 may consist of chemical and/or mechanical bonds between the bodies 15 and 16.

In this particular configuration, the removable anchor means 6 for connecting the seat element 2 to the support element 4 may be formed on the lower body 16.

Finally, the means 5 for connection to the frame T may be formed in the underside 19 of the support element 4.

These means 5 may be common use connection means, such as a pair of longitudinal elements which are removably attached to the support element and anchored to the seat post by normal clamping means. In a preferred, non-limiting embodiment, as shown in the figures, the means 5 for connection to the frame T are formed of one piece with the support element 4 and may be, without limitation, of the same material as the latter.

The above disclosure clearly shows that the structure of the invention fulfills the intended objects and particularly the object of providing a highly customizable seating support for human body support, which can fit the various user needs.

Thanks to the particular design of the anchor means, the configuration of the structure may be changed in a very simple and quick manner.

The structure of the invention is susceptible to a number of changes and variants, within the inventive concept disclosed in the appended claims. All the details thereof may be replaced by other technically equivalent parts, and the materials may vary depending on different needs, without departure from the scope of the invention.

While the structure has been described with particular reference to the accompanying figures, the numerals referred to in the disclosure and claims are only used for the sake of a better intelligibility of the invention and shall not be intended to limit the claimed scope in any manner.

The invention claimed is:

1. A customizable seating structure, designed to be connected to a movable or stationary frame, comprising:

a seat element having a top surface designed to at least partly contact a user;

a support element underlying said seat element and designed to be connected to a movable or stationary frame;

each of said seat element and support element having a widened rear portion and an elongate front portion, the support element comprising an upper portion removably attached to the seat element and a lower portion configured to be connected to a movable or stationary frame, the upper and lower portion being connected one to the other at the respective front portions and being free at the respective rear portions;

removable anchor means for removably attaching the seat element to the support element, said removable anchor means being formed at both the respective front portions and rear portions of each of said support element and said seat element, said seat element being one of a plurality of corresponding similar or equivalent elements, such to allow a customization of the structure in size and shock absorbing properties by only changing the seat element without replacing the entire structure, wherein said removable anchor means comprise self-locking pins formed in the underside of said seat element integrally therewith for engagement in respective through or blind holes in the support element, said pins having a head larger than the diameter of each hole, thereby providing for simple and quick removal and replacement of the seat element without using special tools.

2. The structure as claimed in claim 1, wherein said seat element comprises an upper body and a lower body in mutual coupling relation.

3. The structure as claimed in claim 2, wherein said upper body has a resilient top face, formed into one of a plurality of shapes, to fit various user needs and conditions of use.

4. The structure as claimed in claim 2, wherein said lower body has coupling means for removable connection of said upper body with said lower body.

5. The structure as claimed in claim 2, wherein said lower body is provided with said removable anchor means for connection to said support element.

6. The structure as claimed in claim 1, wherein the movable or stationary frame is the frame of a vehicle.

7. The structure as claimed in claim 1, wherein the support element comprises a semi-rigid material.

* * * * *